US012807164B2

(12) United States Patent
Takenaka et al.

(10) Patent No.: US 12,807,164 B2
(45) Date of Patent: Nov. 24, 2026

(54) DRIVER STATE ESTIMATION APPARATUS, SYSTEM AND ASSOCIATED METHODS

(71) Applicant: Mazda Motor Corporation, Hiroshima (JP)

(72) Inventors: Satoru Takenaka, Aki-gun (JP); Kengo Tanaka, Aki-gun (JP); Ariki Sato, Aki-gun (JP); Koji Iwase, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 64 days.

(21) Appl. No.: 19/040,882

(22) Filed: Jan. 30, 2025

(65) Prior Publication Data

US 2025/0249911 A1 Aug. 7, 2025

(30) Foreign Application Priority Data

Feb. 5, 2024 (JP) ................................ 2024-015448

(51) Int. Cl.
*B60W 40/08* (2012.01)
*B60W 50/16* (2020.01)
(Continued)

(52) U.S. Cl.
CPC ............ *B60W 40/08* (2013.01); *B60W 50/16* (2013.01); *G06V 10/60* (2022.01); *G06V 20/588* (2022.01);
(Continued)

(58) Field of Classification Search
CPC ................ B60W 40/08; B60W 50/16; B60W 2040/0818; B60W 2050/143;
(Continued)

(56) References Cited

U.S. PATENT DOCUMENTS 8,665,099 B2 * 3/2014 Namba ................ G06V 20/597 340/576
11,383,721 B2 * 7/2022 Fung ...................... G06V 10/82
(Continued)

FOREIGN PATENT DOCUMENTS

JP 2017-224066 A 12/2017

*Primary Examiner* — Eric Blount
(74) *Attorney, Agent, or Firm* — XSENSUS LLP

(57) ABSTRACT

A driver state estimation apparatus includes a controller configured to estimate whether the driver is in a first state based on travel environment information and the driver's line of sight. Based on the travel environment information and the driver's line of sight. The controller acquires feature values $x_i$ including a frequency and an amplitude of a saccade of the driver and a top-down attention score indicating a degree of deviation from appropriate line-of-sight distribution to an attention object around the vehicle, uses the acquired feature values $x_i$ and a preset weight coefficient $a_i$ for each of the feature values $x_i$, to calculate a first probability p representing a probability that the driver is in the first state. The controller estimates that the driver is in a first state when the calculated first probability p is equal to or higher than a predetermined value continues for a predetermined time or longer.

20 Claims, 6 Drawing Sheets

(51) Int. Cl.
*G06V 10/60* (2022.01)
*G06V 20/56* (2022.01)
*G06V 20/59* (2022.01)
*B60W 50/14* (2020.01)

(52) U.S. Cl.
CPC ... *G06V 20/597* (2022.01); *B60W 2040/0818* (2013.01); *B60W 2050/143* (2013.01); *B60W 2050/146* (2013.01); *B60W 2420/403* (2013.01); *B60W 2520/10* (2013.01); *B60W 2540/225* (2020.02); *B60W 2540/229* (2020.02); *B60W 2552/15* (2020.02); *B60W 2552/30* (2020.02)

(58) Field of Classification Search
CPC ..... B60W 2050/146; B60W 2420/403; B60W 2520/10; B60W 2540/225; B60W 2540/229; B60W 2552/15; B60W 2552/30; B60W 2040/0827; G06V 10/60; G06V 20/588; G06V 20/597
USPC .......................................................... 340/576
See application file for complete search history.

(56) References Cited

U.S. PATENT DOCUMENTS

| | | | | |
|---|---|---|---|---|
| 2019/0092337 | A1* | 3/2019 | Chua ...................... | B60W 30/14 |
| 2019/0308554 | A1* | 10/2019 | Tsukao ..................... | B60Q 9/00 |
| 2020/0310418 | A1* | 10/2020 | Kanoh .................. | B60W 30/06 |
| 2021/0229677 | A1* | 7/2021 | Sugiyama ............. | B60W 30/08 |
| 2021/0253110 | A1* | 8/2021 | Iwase .................... | B60W 40/08 |

* cited by examiner

DRIVER STATE ESTIMATION APPARATUS, SYSTEM AND ASSOCIATED METHODS

CROSS-REFERENCE TO RELATED APPLICATION

The present application claims priority to Japanese application number 2024-015448 filed in the Japanese Patent Office on Feb. 5, 2024, the entire contents of which are incorporated herein by reference.

TECHNICAL FIELD

The present disclosure relates to a driver state estimation apparatus, system and associated methods that estimate a state of a driver who drives a vehicle.

BACKGROUND ART

One of main causes of traffic accidents is a state where concentration of a driver on driving is lacking, that is, a so-called inattentive state. Conventionally, as a technique for detecting the inattentive state, the following technique and the like have been proposed. The technique (for example, see Patent Literature 1) focuses on a finding that a moving speed and duration per amplitude of a saccade, which is rapid eye movement occurring when the driver's line of sight moves, differ between a case where the driver is consciously looking at a position other than that on a road and a case where the driver is normally and visually recognizing a view in front.

CITATION LIST

Patent Literature

[Patent Literature 1] JP2017-224066A

SUMMARY

Technical Problems

However, in the conventional technique as described above, even in the case where the driver is not in the inattentive state, the driver may be estimated in the inattentive state when a frequency or a change amount of the movement of the driver's line of sight is changed due to a disease, aging, or the like. That is, in the conventional technique, accurate estimation that the abnormal driving the driver is due to the inattentive state as distinguished from other abnormal states, e.g., due to disease.

The disclosure has been made to solve such a problem, and embodiments are directed to providing a driver state estimation apparatus capable of distinguishing that a driver is in a first state, i.e., a temporary abnormal state due to inattention as distinguished from other abnormal states, e.g., due to disease.

Solutions to Problems

In order to solve the above-described and other problems, the disclosure is directed to a driver state estimation apparatus that estimates a state of a driver who drives a vehicle, and includes: a travel environment information acquisition device that acquires travel environment information of the vehicle; a line-of-sight detection device that detects the driver's line of sight; and a controller configured to estimate whether the driver is in an inattentive state on the basis of the travel environment information and the driver's line of sight. The controller is configured to acquire a feature value $x_i$ ($i=1, \ldots, n$) of each of a plurality of indicators of search behavior changed according to the driver's state on the basis of the travel environment information and the driver's line of sight, calculate an inattentive probability p, which represents a probability that the driver is in the inattentive state, by the following equation using the acquired feature value $x_i$, a preset weight coefficient $a_i$ for each of the feature values $x_i$, and a preset constant $a_0$, and $$p = \frac{1}{1 + e^{-(a_0 + \sum_{i=1}^{n} a_i x_i)}}$$

estimate that the driver is in the inattentive state when a state where the calculated inattentive probability p is equal to or higher than a predetermined value continues for a predetermined time or longer. The feature values $x_i$ include: a frequency and an amplitude of a saccade of the driver that are acquired on the basis of the driver's line of sight; and a top-down attention score that indicates a degree of deviation from appropriate line-of-sight distribution to an attention object around the vehicle, which is acquired on the basis of the travel environment information and the driver's line-of-sight.

Accordingly, for each of the plurality of indicators of the search behavior changed according to the driver's state, the controller acquires the feature values $x_i$ including: the frequency and the amplitude of the saccade of the driver; and the top-down attention score indicating the degree of deviation from the appropriate line-of-sight distribution to the attention object around the vehicle, and uses the acquired feature values $x_i$, the preset weight coefficient $a_i$ for each of the feature values $x_i$, and the preset constant $a_i$ to calculate the inattentive probability p by the sigmoidal function. Accordingly, instead of only focusing on any of the indicators of the driver's search behavior as in conventional approaches, unique changes in the frequency and the amplitude of the saccade are comprehensively grasped to quantitatively evaluate the probability that the driver is in the inattentive state, thereby improving the estimation thereof. By further using the top-down attention score in the inattentive state of the driver, the estimation may further accurately distinguish between the first state and the second state, further improving estimation. In this way, it is possible to estimate the inattentive state by distinguishing the changes in the feature values therein from those caused by a disease, aging, or the like of the driver.

The controller may be configured to correct each of the acquired feature values $x_i$ based on the travel environment information.

Accordingly, the controller corrects each of the acquired feature values $x_i$ based on the travel environment information. Thus, the feature values $x_i$ may be corrected to cancel an influence of travel environment of the vehicle to further accurately calculate the inattentive probability p. Thus, erroneous estimation of the driver being in the first state due to the travel environment may be prevented.

The controller may be configured to acquire a gradient of a road on which the vehicle is traveling based on the travel environment information and correct the feature value $x_i$ in a direction in which the driver is less likely to be estimated in the inattentive state as the gradient is increased.

Accordingly, the controller corrects the feature value $x_i$ in the direction in which the driver is less likely to be estimated in the inattentive state as the gradient of the road on which the vehicle is traveling is increased. Accordingly, when the driver is likely to be estimated in the inattentive state due to the large gradient of the road and a tendency that the driver's line of sight is concentrated on a narrow range, the feature value $x_i$ may be corrected to cancel an influence of the gradient of the road and thus to further accurately calculate the inattentive probability p.

The controller may be configured to acquire curvature of a road on which the vehicle is traveling based on the travel environment information and correct the feature value $x_i$ in a direction in which the driver is less likely to be estimated in the inattentive state as the curvature is increased.

Accordingly, the controller corrects the feature value $x_i$ in a direction in which the driver is less likely to be estimated in the inattentive state as the curvature of the road on which the vehicle is traveling is increased. Accordingly, when the driver is likely to be estimated in the inattentive state due to the large curvature of the road and the tendency that the driver's line of sight is concentrated on the narrow range, the feature value $x_i$ may be corrected to cancel an influence of the curvature of the road and thus to further accurately calculate the inattentive probability p.

The controller may be configured to acquire illuminance outside the vehicle based on the travel environment information and correct the feature value $x_i$ in a direction in which the driver is less likely to be estimated in the inattentive state as the illuminance is reduced.

Accordingly, the controller corrects the feature value $x_i$ in the direction in which the driver is less likely to be estimated in the inattentive state as the illuminance outside the vehicle is reduced. Accordingly, when the driver is likely to be estimated in the inattentive state due to the low illuminance outside the vehicle and the tendency that the driver's line of sight is concentrated on the narrow range, the feature value $x_i$ may be corrected to cancel an influence of the illuminance and thus to further accurately calculate the inattentive probability p.

The controller may be configured to acquire a speed of the vehicle based on the travel environment information and correct the feature value $x_i$ in a direction in which the driver is less likely to be estimated in the inattentive state as the speed is increased.

Accordingly, the controller corrects the feature value $x_i$ in the direction in which the driver is less likely to be estimated in the inattentive state as the speed of the vehicle is increased. Accordingly, when the driver is likely to be estimated in the inattentive state due to the high vehicle speed and the tendency that the driver's line of sight is concentrated on the narrow range, the feature value $x_i$ may be corrected to cancel an influence of the vehicle speed and thus to further accurately calculate the inattentive probability p.

Advantage Effects

According to the driver state estimation apparatus of the disclosure, it is possible to estimate that the driver is in the inattentive state by distinguishing the inattentive state from other abnormal states such as a disease.

DESCRIPTION OF EMBODIMENTS

Hereinafter, a driver state estimation apparatus according to an embodiment will be described with reference to the accompanying drawings.

[System Configuration]

Figure 1:
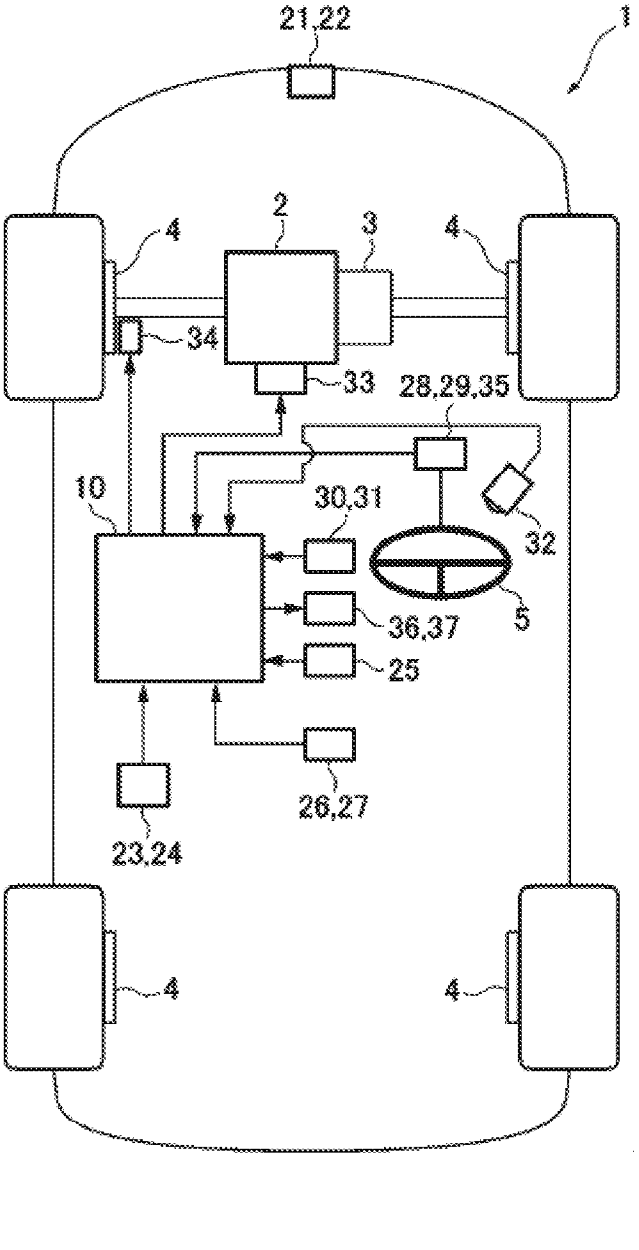
FIG. 1 is an explanatory view of a vehicle on which a driver state estimation apparatus according to an embodiment is mounted.
Figure 2:
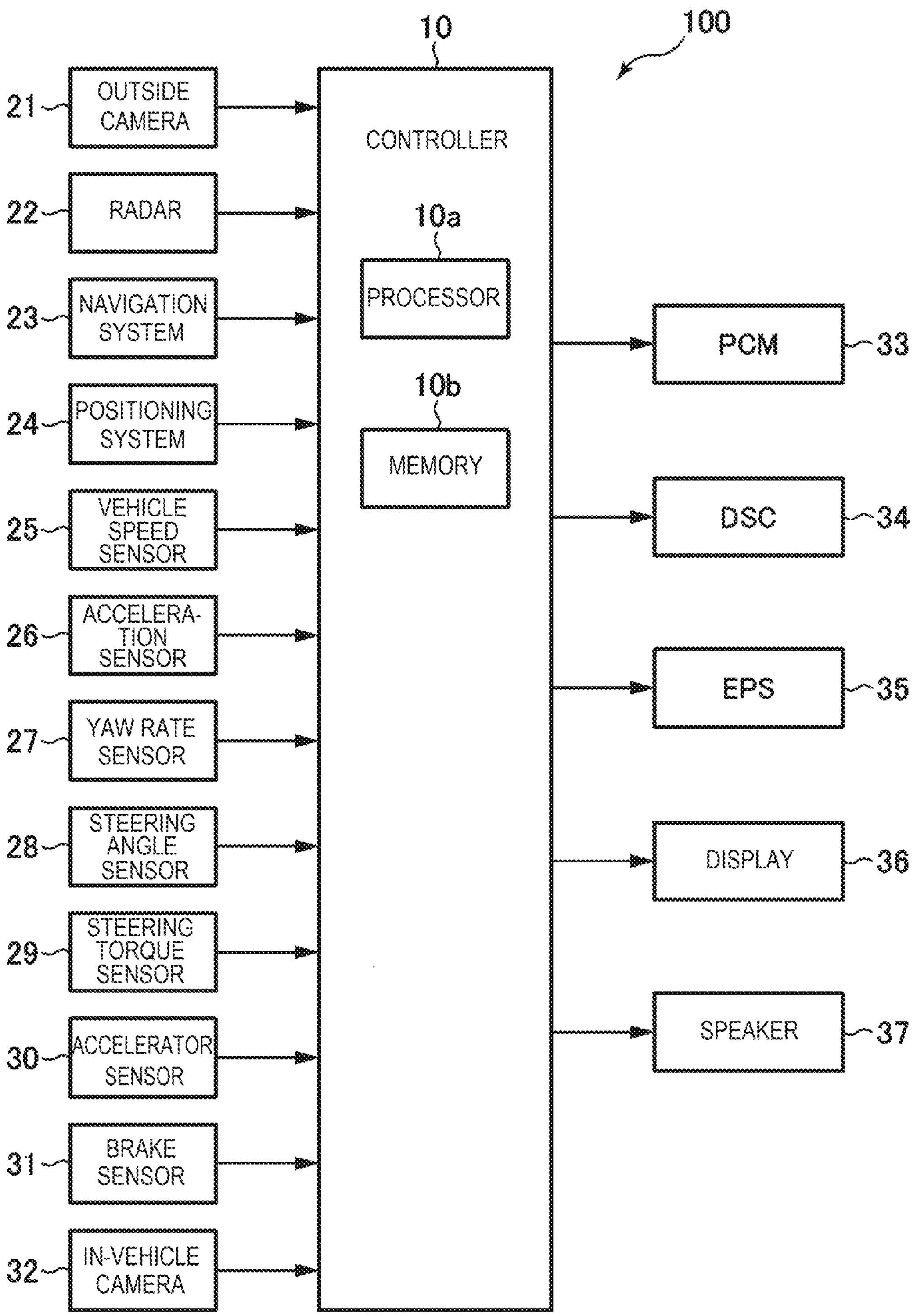
FIG. 2 is a block diagram of the driver state estimation apparatus according to the embodiment.

First, a configuration of the driver state estimation apparatus according to the present embodiment will be described with reference to FIGS. 1 and 2. FIG. 1 is an explanatory view of a vehicle on which the driver state estimation apparatus is mounted, and FIG. 2 is a block diagram of the driver state estimation apparatus.

A vehicle 1 according to the present embodiment includes: a driving force source 2, such as an engine or an electric motor, that outputs a driving force; a transmission 3 that transmits the driving force output from the driving force source 2 to drive wheels; a brake 4 that applies a braking force to the vehicle 1; and a steering device 5 for steering the vehicle 1.

A driver state estimation apparatus 100 is configured to estimate a state of a driver of the vehicle 1 and execute control of the vehicle 1 and driver assistance control when necessary. As illustrated in FIG. 2, the driver state estimation apparatus 100 includes a controller 10, a plurality of sensors, a plurality of control systems, and a plurality of information output devices.

More specifically, the plurality of sensors include an outside camera 21 and a radar 22 for acquiring travel environment information of the vehicle 1, and a navigation system 23 and a positioning system 24 for detecting a position of the vehicle 1. The plurality of sensors also include a vehicle speed sensor 25, an acceleration sensor 26, a yaw rate sensor 27, a steering angle sensor 28, a steering torque sensor 29, an accelerator sensor 30, and a brake sensor 31 for detecting behavior of the vehicle 1 and a driving operation by the driver. The plurality of sensors further include an in-vehicle camera 32 for detecting the driver's line of sight. The plurality of control systems include a powertrain control module (PCM) 33 that controls the driving force source 2 and the transmission 3, a dynamic stability control system (DSC) 34 that controls the driving force source 2 and the brake 4, and an electric power steering system (EPS) 35 that controls the steering device 5. The plurality of information output devices include a display 36 that outputs image information and a speaker 37 that outputs audio information.

Moreover, other sensors may include: a peripheral sonar that measures a distance to and a position of a structure around the vehicle 1; corner radars, each of which measures approach of the peripheral structure at respective one of four corners of the vehicle 1; and various sensors, each of which detects the driver's state (for example, a heartbeat sensor, an electrocardiogram sensor, a steering wheel grip force sensor, and the like).

The controller 10 performs various calculations based on signals received from the plurality of sensors, transmits, to the PCM33, the DSC34, the EPS35, control signals for appropriately actuating the driving force source 2, the transmission 3, the brake 4, and the steering device 5, and transmits control signals for outputting desired information to the display 36 and the speaker 37. The controller 10 is configured by a computer that includes one or more processors 10*a* (typically, CPUs), memory 10*b* (a non-transitory computer readable medium such as ROM and RAM) for storing various programs and data, an input/output device, and the like. The one or more processors 10*a* each include programable circuitry to perform various calculations on received signals and output control signals that control an operation of the vehicle. As used herein, the term "circuitry" may be one or more circuits that optionally include programmable circuitry. Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions stored in the memory 10*b* that, when executed by the one or more processors 10*a*, cause the one or more processors 10*a* to perform the method. The methods and systems described herein may be implemented using computer programming or engineering techniques including computer software, firmware, hardware or any combination or subset thereof.

The outside camera 21 captures an image of the surroundings of the vehicle 1 and outputs image data. The controller 10 recognizes an object (for example, a preceding vehicle, a parked vehicle, a pedestrian, a travel road, a division line (a lane boundary line, a white line, and a yellow line), a traffic signal, a traffic sign, a stop line, an intersection, an obstacle, and the like) on the basis of the image data received from the outside camera 21. In addition, the controller 10 can identify curvature of a road on which the vehicle 1 is traveling and illuminance outside the vehicle 1 based on the image data received from the outside camera 21. The outside camera 21 corresponds to an example of the "travel environment information acquisition device" in the disclosure.

The radar 22 measures a position and a speed of the object (in particular, the preceding vehicle, the parked vehicle, the pedestrian, a dropped object on the travel road, and the like). A millimeter wave radar can be used as the radar 22, for example. The radar 22 transmits a radio wave in an advancing direction of the vehicle 1 and receives a reflected wave that is generated when the transmitted wave is reflected by the object. Then, the radar 22 measures a distance (for example, an inter-vehicle distance) between the vehicle 1 and the object and a relative speed of the object to the vehicle 1 based on the transmitted wave and the received wave. In the present embodiment, instead of the radar 22, a laser radar, an ultrasonic sensor, or the like may be used to measure the distance to and the relative speed of the object. Alternatively, a plurality of sensors may be used to form a position and speed measurement device. The radar 22 corresponds to an example of the "travel environment information acquisition device" in the disclosure.

The navigation system 23 stores map information therein and can provide the map information to the controller 10. The controller 10 identifies the road, the intersection, the traffic signal, a building, and the like that are present around (in particular, in the advancing direction of) the vehicle 1 based on the map information and current vehicle position information. The controller 10 can also identify the curvature and a gradient of the road on which the vehicle 1 is traveling on the basis of the map information and the current vehicle position information. The map information may be stored in the controller 10. The positioning system 24 is a GPS system and/or a gyroscopic system that detects the position of the vehicle 1 (the current vehicle position information). The navigation system 23 and the positioning system 24 also correspond to examples of the "travel environment information acquisition device" in the disclosure.

The vehicle speed sensor 25 detects a speed of the vehicle 1 based on a rotational speed of the wheel or a driveshaft, for example. The acceleration sensor 26 detects acceleration of the vehicle 1. This acceleration includes acceleration in a longitudinal direction of the vehicle 1 and acceleration in a lateral direction (that is, lateral acceleration) thereof. In addition, the controller 10 can identify the gradient of the road on which the vehicle 1 is traveling based on the speed and the acceleration of the vehicle 1. In the present specification, the acceleration includes not only a change rate of the speed in a speed increasing direction but also a change rate of the speed in a speed reducing direction (that is, deceleration). The vehicle speed sensor 25 and the acceleration sensor 26 also correspond to examples of the "travel environment information acquisition device" in the disclosure.

The yaw rate sensor 27 detects a yaw rate of the vehicle 1. The steering angle sensor 28 detects a rotation angle (a steering angle) of a steering wheel of the steering device 5. The steering torque sensor 29 detects torque (steering torque) that is applied to a steering shaft via the steering wheel. The accelerator sensor 30 detects a depression amount of an accelerator pedal. The brake sensor 31 detects a depression amount of a brake pedal. Here, the yaw rate sensor 27, the steering angle sensor 28, the steering torque sensor 29, the accelerator sensor 30, and the brake sensor 31 also correspond to examples of the "travel environment information acquisition device" in the disclosure.

The in-vehicle camera 32 captures an image of the driver and outputs image data. The controller 10 detects the driver's line of sight direction based on the image data received from the in-vehicle camera 32. The in-vehicle camera 32 corresponds to an example of the "line-of-sight detection device" in the disclosure.

The PCM 33 controls the driving force source 2 of the vehicle 1 to adjust the driving force of the vehicle 1. For example, the PCM 33 controls an ignition plug, a fuel injection valve, a throttle valve, and a variable valve mechanism of the engine, the transmission 3, an inverter that supplies electric power to the electric motor, and the like. When the vehicle 1 is to be accelerated or decelerated, the controller 10 transmits a control signal for adjusting the driving force to the PCM 33.

The DSC 34 controls the driving force source 2 and the brake 4 of the vehicle 1 and executes deceleration control and posture control of the vehicle 1. For example, the DSC 34 controls a hydraulic pump, a valve unit, and the like of the brake 4, and controls the driving force source 2 via the PCM 33. When the deceleration control or the posture control of the vehicle 1 is to be executed, the controller 10 transmits, to the DSC 34, a control signal for adjusting the driving force or generating the braking force.

The EPS 35 controls the steering device 5 of the vehicle 1. For example, the EPS 35 controls an electric motor that applies the torque to the steering shaft of the steering device 5, and the like. When the advancing direction of the vehicle 1 is to be changed, the controller 10 transmits a control signal for changing a steering direction to the EPS 35.

The display 36 is provided in front of the driver in a cabin and shows the image information for the driver. A liquid crystal display or a head-up display is used as the display 36, for example. The speaker 37 is installed in the cabin and outputs various types of the audio information.

[Driver State Estimation]

Figure 3:
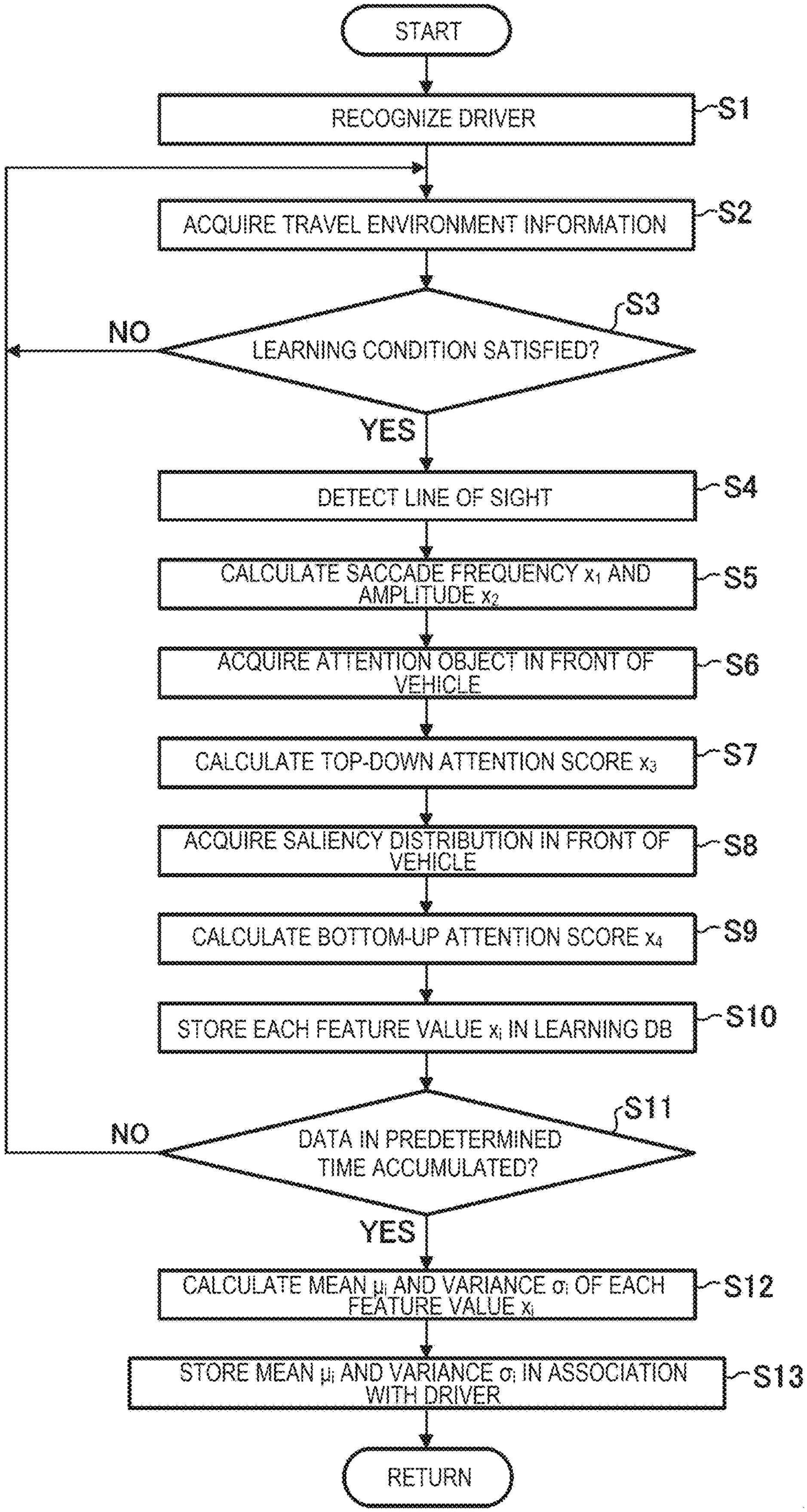
FIG. 3 is a flowchart of individual learning processing according to the embodiment.
Figure 4:
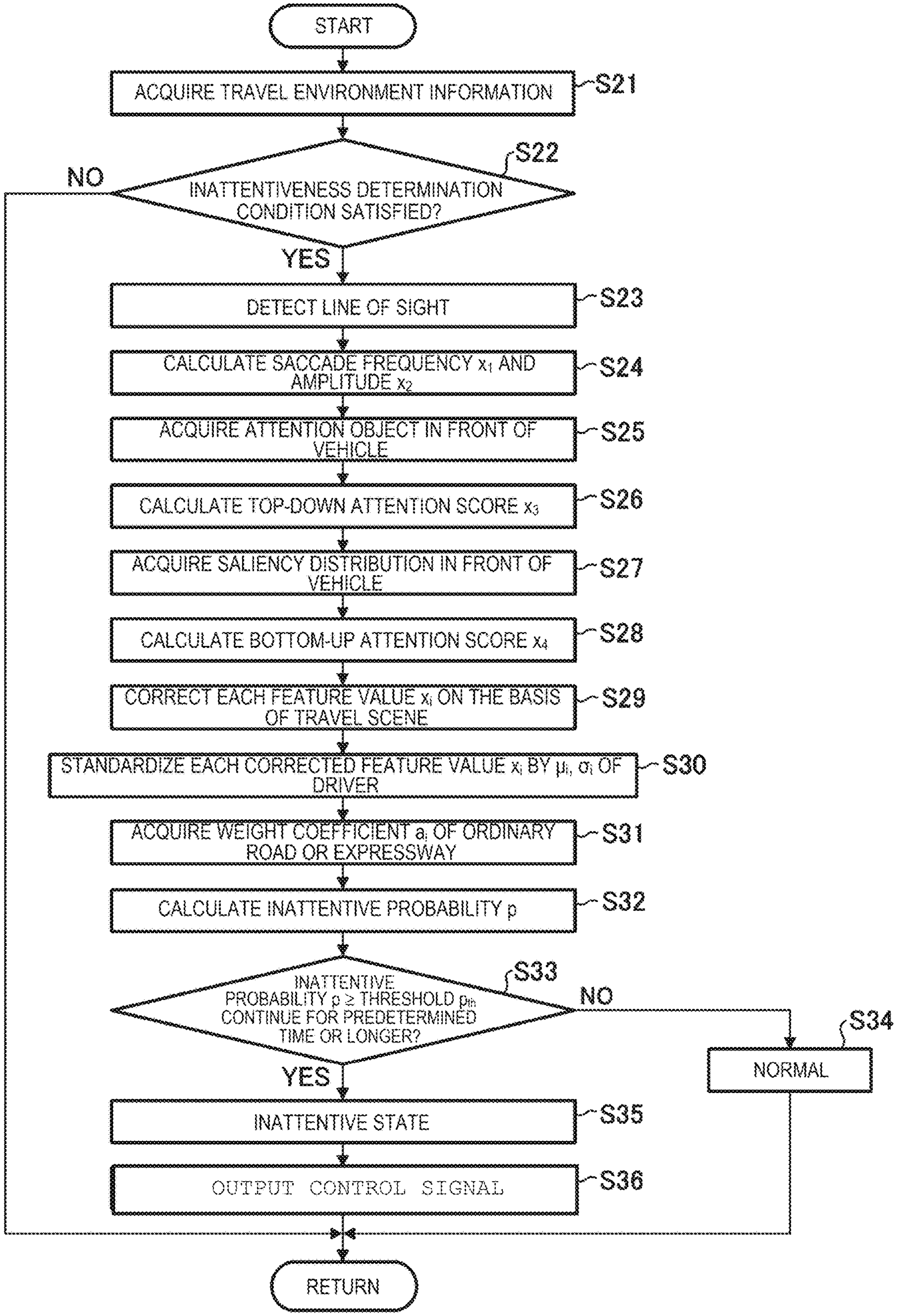
FIG. 4 is a flowchart of driver state estimation processing according to the embodiment.

Next, driver state estimation by the driver state estimation apparatus 100 of the present embodiment will be described with reference to FIG. 3 to FIG. 5D. FIG. 3 is a flowchart of individual learning processing in which individual learning is performed to standardize feature values of search behavioral indicators. FIG. 4 is a flowchart of driver state estimation processing to estimate whether the driver is in an inattentive state, i.e., a first state that is a temporary abnormal state, or a third state, i.e. a normal state. FIGS. 5A to 5D includes graphs, each of which illustrates a correction coefficient map for correcting the feature value of the search behavioral indicator.

First, an overview of the driver state estimation in the present embodiment will be described. The present inventors conducted driving experiments for 100 subjects or more by using a driving simulator to examine how behavior of the driver to visually check the surroundings of the vehicle (in particular, in the advancing direction of the vehicle) (hereinafter, referred to as the "search behavior") is changed between a case where the driver was in a normal state and a case where the driver was in the inattentive state. More specifically, the subjects were made to travel in various types of travel environment (an urban area, an expressway, a mountain road, daytime, nighttime, and the like) for each of a case where the inattentive state was simulated by making the driver perform a mental calculation so as not to be able to concentrate on driving and a case where the normal state was simulated by making the driver drive normally without performing the mental calculation, and thereby the movement of the driver's line of sight during driving was measured.

As a result, it was found that feature values (including a frequency and an amplitude of a saccade, for example) of a plurality of indicators related to the driver's search behavior were each changed according to a tendency peculiar to respective one of the indicators between the case where the driver was normal and the case where the driver was in the inattentive state. Accordingly, the inventors considered that it was possible to calculate a probability that the driver was in the inattentive state from each of the feature values during actual travel by setting whether the estimated driver's behavior corresponded to the case where the inattentive state of the driver was simulated and the case where the normal state thereof was simulated as response variables of two values from data on the movement of the line of sight acquired by the above driving experiments and data on the travel environment simulated by the driving simulator, by setting a value acquired by standardizing each of the feature values of the plurality of the indicators of the search behavior as an explanatory variable, and by making a logistic regression analysis and acquiring a regression coefficient in advance.

More specifically, the driver state estimation apparatus 100 acquires each of the feature values of the plurality of the indicators of the driver's search behavior based on the travel environment information of the vehicle 1 and the driver's line of sight. For example, the driver state estimation apparatus 100 acquires, as the feature values of the plurality of the indicators of the search behavior: the amplitude and the frequency of the saccade of the driver's line of sight; a top-down attention score that indicates a degree of deviation from appropriate line-of-sight distribution to an attention object around the vehicle 1; and a bottom-up attention score that indicates a degree of the line of sight being directed to a high position of saliency. Then, each of the acquired feature values is corrected according to a travel scene such as the gradient or the curvature of the road. Furthermore, each of the corrected feature values is standardized by using an average value and a variance of each of the feature values, which are acquired in advance by executing the individual learning processing per driver, at the time when the driver is in a normal state. Lastly, the probability that the driver is in the inattentive state is calculated by substituting each of the feature the standardization into a bounded, monotonic, differentiable, real function, e.g., a sigmoid function that includes a regression coefficient acquired by making the logistic regression analysis based on the above-described driving experiment. When a state where the calculated probability is equal to or higher than a predetermined threshold continues for a predetermined time or longer, the driver state estimation apparatus 100 estimates that the driver is in the inattentive state. Just as described, instead of only focusing on any of the indicators of the driver's search behavior, unique changes in the feature values of the plurality of the indicators in the inattentive state of the driver are comprehensively grasped to quantitatively evaluate the probability that the driver is in the inattentive state. In this way, the inattentive state may be distinguished from those other abnormal states caused by a disease, aging, or the like of the driver.

[Individual Learning Processing]

Next, the individual learning processing will be described with reference to FIG. 3. In the individual learning processing, the driver state estimation apparatus 100 calculates, per driver, the average value and the variance of each of the feature values, which are used when each of the feature values of the plurality of the indicators of the search behavior is standardized in the driver state estimation processing. That is, the individual learning of the average value and the variance of each of the feature values at the time when the driver is in the normal state is performed. The individual learning processing starts, for example, when first travel on the day of the vehicle 1 starts.

When the individual learning processing starts, the controller 10 first recognizes the current driver, for example, based on the information received from the in-vehicle camera 32 (step S1).

Next, the controller 10 acquires the travel environment information on the basis of the signals received from the sensors including the outside camera 21, the radar 22, the navigation system 23, the positioning system 24, the vehicle speed sensor 25, the acceleration sensor 26, the yaw rate sensor 27, the steering angle sensor 28, the steering torque sensor 29, the accelerator sensor 30, and the brake sensor 31 (step S2).

Next, the controller 10 determines whether a condition (a learning condition) for performing the individual learning is satisfied based on the travel environment information acquired in step S1 (step S3). The individual learning has to be performed when an influence of the travel environment on the driver's search behavior is relatively small and when the driver is in the normal state. For example, the influence of the travel environment on the driver's search behavior is considered to be relatively small when the following conditions are satisfied: that the vehicle 1 is currently located in the urban area; that the vehicle speed is within a predetermined range (for example, 20 km/h or higher and lower than 60 km/h), that the road on which the vehicle is traveling is flat (for example, the gradient is less than 3%), that the road on which the vehicle is traveling is straight (for example, the radius of curvature is 2000 m or larger), and that the current time is the daytime. In addition, when there is no sudden driving operation or impact, a danger avoidance operation or a collision caused by the driver's inattentive state is considered not to have occurred, that is, the driver is in the normal state. Thus, the controller 10 determines that the condition for performing the individual learning is satisfied when the following is satisfied: that the current position of the vehicle 1 is the urban area, that the vehicle speed is within the predetermined range (for example, 20 km/h or higher and lower than 60 km/h), that the road on which the vehicle is traveling is flat (for example, the gradient is less than 3%), that the road on which the vehicle is traveling is straight (for example, the radius of curvature is 2000 m or larger), that the current time is the daytime, and that the sudden driving operation or impact is absent.

As a result, if the condition for performing the individual learning is not satisfied (step S3: NO), the processing returns to step S2, and the processing in steps S2 and S3 is repeated until the condition for performing the individual learning is satisfied.

On the other hand, if the condition for performing the individual learning is satisfied (step S3: YES), the controller 10 detects the driver's line of sight based on the signal received from the in-vehicle camera 32 (step S4).

Next, the controller 10 calculates the frequency $x_1$ and an amplitude $x_2$ of the saccade on the basis of the detected driver's line of sight (step S5). The saccade is one of the indicators related to the driver's search behavior. The saccade is jumping eye movement for capturing a visual target in the central retina fovea, and refers to eye movement for moving the line of sight from a gazing point, where the line of sight is stagnated for a predetermined time, to a next gazing point. In the present embodiment, the amplitude and the frequency of the saccade are used as the feature values of the saccade. The amplitude of the saccade refers to an amount of movement when the driver's line of sight moves from the gazing point to the next gazing point, and the frequency of the saccade refers to the number of times the line of sight moves from the gazing point to the next gazing point within a predetermined time. For example, the controller 10 calculates, as the saccade frequency $x_1$, the number of the saccades per unit time based on the number of the saccades within the predetermined time (for example, 30 seconds). In addition, the controller 10 calculates, as the saccade amplitude $x_2$, an average value of the saccade amplitudes in the latest predetermined time (for example, 30 seconds).

Next, the controller 10 acquires the object (the attention object), to which the driver should pay attention, in front of the vehicle 1 in the advancing direction based on the travel environment information acquired in step S1 (step S6). Examples of the attention object include another vehicle, the obstacle, the pedestrian, the traffic light, and the road sign.

Next, the controller 10 calculates a top-down attention score $x_3$ based on the driver's line of sight detected in step S4 and the attention object acquired in step S6 (step S7). Top-down attention is one of the indicators related to the driver's search behavior, and refers to an attention mechanism to actively move the line of sight to a position intended by a person. For example, when the driver recognizes in advance that the other vehicle is the attention object, the driver can actively direct his or her line of sight toward the other vehicle in preference to the other position. In the present embodiment, the top-down attention score is used as a feature value of the top-down attention. The top-down attention score refers to a numerical value that indicates the degree of deviation from the appropriate line-of-sight distribution to the attention object around the vehicle 1.

For example, based on a top-down attention model created in advance and the travel environment information, the controller 10 calculates the appropriate number of times of gazing and a gazing time when the driver gazes at each of the attention objects existing in front of the vehicle 1 for a predetermined time (for example, 10 seconds). The top-down attention model is a mathematical expression in which a coefficient is set such that the appropriate number of times of gazing and the gazing time for each of the attention objects are calculated by substituting the vehicle speed, a time to collision (TTC) of the attention object, and a time when the attention object exists within a visible range in front of the vehicle 1. The top-down attention model is created in advance by conducting the driving experiments for the plurality of subjects in the normal state by using the driving simulator and by learning results of the driving experiments, and is stored in the memory 10*b*.

Furthermore, the controller 10 acquires, from the travel environment information and the driver's line of sight, the number of times of gazing and the gazing time when the driver gazes at each of the attention objects existing in front of the vehicle 1 in the latest predetermined time (for example, 10 seconds), and calculates, for each of the attention objects, differences from the appropriate number of times of gazing and the gazing time, which are calculated using the top-down attention model. Then, the controller 10 calculates, as top-down attention score $x_3$, a value acquired by multiplying an average value of the differences in the number of times of gazing and an average value of the differences in the gazing times for each of the calculated attention objects.

Next, the controller 10 acquires the saliency distribution for the latest predetermined time (for example, 30 seconds) in front of the vehicle 1 in the advancing direction based on the travel environment information acquired in step S1 (step S8). The saliency is a property to attract a gaze of a person. That is, a high saliency region in the driver's field of view is a region that easily attracts the driver's gaze due to a large color difference or a large luminance difference or large movement with respect to the surrounding region, for example. The controller 10 can acquire the saliency distribution by processing temporal and spatial arrangement of colors, brightness, contrast, motion, and the like in the image acquired from the outside camera 21 by a known image processing method.

Next, the controller 10 calculates a bottom-up attention score $x_4$ based on the driver's line of sight detected in step S4 and the saliency distribution acquired in step S8 (step S9). Bottom-up attention is one of the indicators related to the driver's search behavior, and refers to an attention mechanism to passively move the line of sight to a high saliency position. In the present embodiment, the bottom-up attention score is used as a feature value of the bottom-up attention. The bottom-up attention score refers to a numerical value that indicates the degree of deviation from the appropriate line-of-sight distribution to the attention object around the vehicle 1.

For example, the controller 10 generates a Receiver Operating Characteristic (ROC) curve in which a probability that the saliency at a random point in front of the vehicle 1 exceeds a predetermined threshold and a probability that the saliency in a direction of the driver turning his/her line of sight exceeds a predetermined threshold in the latest predetermined time (for example, 30 seconds), which are acquired based on the travel environment information and the driver's line of sight, are plotted while the predetermined thresholds are changed. Then, the controller 10 multiplies an area under the curve (AUC) of the ROC curve by a predetermined coefficient to calculate the bottom-up attention score $x_4$. In this case, as the tendency of the driver to direct his/her line of sight to the object with the high saliency is increased, the AUC becomes close to 1 as a maximum value, and the bottom-up attention score $x_4$ is increased.

Next, the controller 10 stores the feature values $x_i$ (i=1, 2, 3, 4) calculated in steps S5, S7, and S9 in a learning database (step S10). The learning database is stored in the memory 10*b*.

Next, the controller 10 determines whether a total time in which each of the feature values $x_i$ is accumulated in the learning database after the start of the individual learning processing, that is, a time in which the learning condition is satisfied after the start of the individual learning processing has reached a predetermined time (for example, 20 minutes) (step S11). As a result, if the total time in which each of the feature values $x_i$ is accumulated has not reached the predetermined time (step S11: NO), the processing returns to step S2, and the processing in steps S2 to S11 is repeated until the total time in which each of the feature values $x_i$ is accumulated reaches the predetermined time.

On the other hand, if the total time in which each of the feature values $x_i$ is accumulated has reached the predetermined time (step S11: YES), the controller 10 calculates a mean $\mu_i$ and a variance $\sigma_i$ of each of feature values $x_i$ (step S12).

Next, the controllers 10 store the mean $\mu_i$ and the variance $\sigma_i$ calculated in step S12 in the memory 10*b* in association with the drivers recognized in step S1 (step S13). Thereafter, the controller 10 terminates the individual learning processing.

[Driver State Estimation Processing]

Next, the driver state estimation processing will be described with reference to FIG. 4. The driver state estimation processing starts when the vehicle 1 is powered on, and is repeatedly executed by the controller 10 at a predetermined cycle (for example, every 0.05 to 0.2 second). The driver state estimation processing can also be executed in parallel with the individual learning processing that has been described with reference to FIG. 3.

When the driver state estimation processing starts, the controller 10 first acquires the travel environment information based on the signals received from the sensors including the outside camera 21, the radar 22, the navigation system 23, the positioning system 24, the vehicle speed sensor 25, the acceleration sensor 26, the yaw rate sensor 27, the steering angle sensor 28, the steering torque sensor 29, the accelerator sensor 30, and the brake sensor 31 (step S21).

Next, based on the travel environment information acquired in step S21, the controller 10 determines whether an inattentiveness determination condition for determining the inattentive state of the driver, that is, a condition for estimating the driver's state is satisfied (step S22). There is a travel scene in which the driver's line of sight is mistakenly estimated as the inattentive state due to concentration of the driver's line of sight in a narrow range, and examples of such a scene include a case where the vehicle 1 is traveling in a tunnel or an interchange and a case where the vehicle 1 is changing a lane. Accordingly, the travel scene that is likely to be erroneously estimated as the inattentive state and a travel scene in which the driver is unlikely to be in the inattentive state in the first place are defined in advance as travel scenes, each of which is not subject to the driver state estimation. Then, in the case where the travel scene that is identified from the travel environment information acquired in step S21 does not correspond to the travel scene that is not subjected to the driver state estimation, the controller 10 determines that the inattentiveness determination condition is satisfied.

As a result, if the inattentiveness determination condition is not satisfied (step S22: NO), the controller 10 terminates the driver state estimation processing.

On the other hand, if the inattentiveness determination condition is satisfied (step S22: YES), the controller 10 detects the driver's line of sight based on the signal received from the in-vehicle camera 32 (step S23).

Next, the controller 10 calculates the frequency $x_1$ and the amplitude $x_2$ of the saccade on the basis of the detected driver's line of sight (step S24). Methods for calculating the frequency $x_1$ and the amplitude $x_2$ of the saccade are the same as those in step S5 for the individual learning processing.

Next, based on the travel environment information acquired in step S21, the controller 10 acquires the object (the attention object), to which the driver should pay attention, in front of the vehicle 1 in the advancing direction (step S25).

Next, the controller 10 calculates the top-down attention score $x_3$ on the basis of the driver's line of sight detected in step S23 and the attention object acquired in step S25 (step S26). A method for calculating the top-down attention score $x_3$ is the same as that in step S7 for the individual learning processing.

Next, the controller 10 acquires the saliency distribution for the latest predetermined time (for example, 30 seconds) in front of the vehicle 1 in the advancing direction based on the travel environment information acquired in step S21 (step S27).

Next, the controller 10 calculates the bottom-up attention score $x_4$ based on the driver's line of sight detected in step S23 and the saliency distribution acquired in step S27 (step S28). A method for calculating the bottom-up attention score $x_4$ is the same as that in step S9 for the individual learning processing.

Next, the controller 10 corrects each of the feature values $x_i$ (i=1, 2, 3, 4) calculated in steps S24, S26, and S28 based on the travel scene (step S29). More specifically, for each of the road gradient, the road curvature, the illuminance, and the vehicle speed, a correction coefficient map in which a correction coefficient of the respective feature value $x_i$ is determined is stored in the memory 10*b*. The controller 10 acquires the gradient and the curvature of the road on which the vehicle 1 is traveling, the illuminance outside the vehicle 1, and the vehicle speed based on the travel environment information acquired in step S21, and acquires the correction coefficient that corresponds to each of the acquired road gradient, road curvature, illuminance, and vehicle speed with reference to the respective correction coefficient map stored in the memory 10*b*. Then, the controller 10 makes a correction by multiplying each of the feature values $x_i$ by the acquired correction coefficient.

Figure 5A:
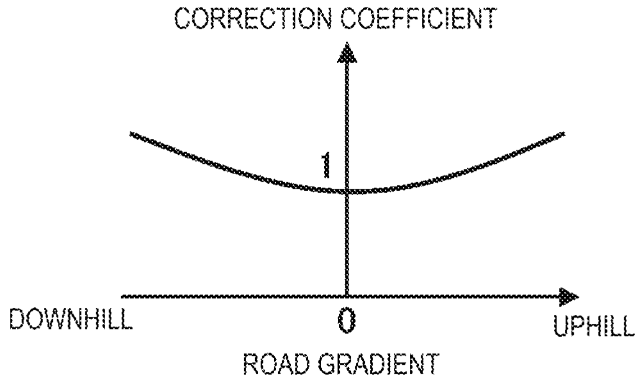
FIGS. 5A to 5D include graphs, each of which exemplifies a correction coefficient map according to the embodiment.

FIG. 5A is an exemplary map that defines the correction coefficient of the saccade frequency $x_i$ according to the road gradient. When the uphill or downhill road gradient increases, the driver attempts to check a condition of the road in the advancing direction well, and thus, the driver's line of sight tends to be concentrated on a narrow range. As the result, the saccade frequency $x_1$ may be reduced and become a similar value to the saccade frequency in the inattentive state. Accordingly, the correction coefficient is set such that, as the uphill or downhill road gradient increases, the correction coefficient of the saccade frequency $x_1$ becomes larger than 1, that is, set in a direction in which the driver is less likely to be estimated in the inattentive state. In other words, the correction coefficient increases as the road gradient increases. In this way, the saccade frequency $x_1$ can be corrected in a manner to cancel the influence of the road gradient.

Figure 5B:
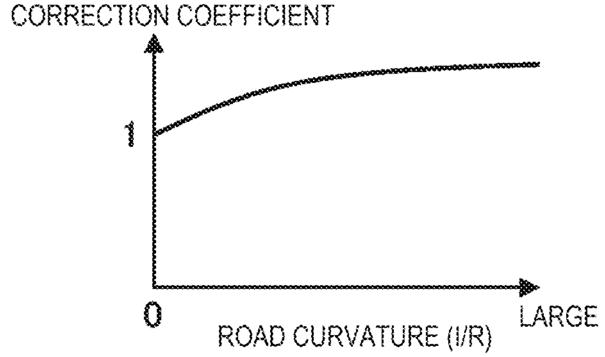

FIG. 5B is an exemplary map that defines the correction coefficient in the saccade frequency $x_i$ according to the road curvature. As the road curvature increases (that is, the road becomes a curve or a steep curve), the driver attempts to check the condition of the road in the advancing direction well, and thus, the driver's line of sight tends to be concentrated on the narrow range. As the result, the saccade frequency $x_1$ may be reduced and become the similar value to the saccade frequency in the inattentive state. Accordingly, the correction coefficient is set such that, as the road curvature increases, the correction coefficient of the saccade frequency $x_1$ becomes larger than 1, that is, set in the direction in which the driver is less likely to be estimated in the inattentive state. In other words, the correction coefficient increases as the road curvature increases. In this way, the saccade frequency $x_1$ can be corrected in a manner to cancel the influence of the road curvature.

Figure 5C:
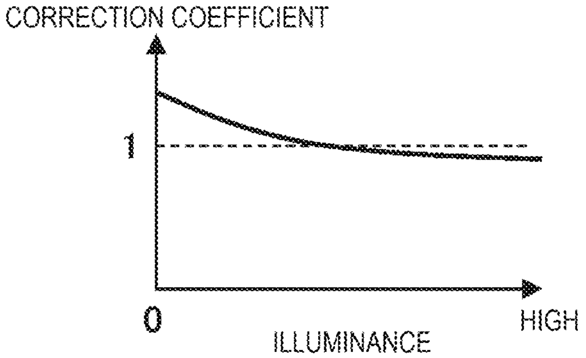

FIG. 5C is an exemplary map that defines the correction coefficient of the saccade frequency $x_1$ according to the illuminance outside the vehicle. When the illuminance becomes low (that is, the outside of the vehicle becomes dark), the driver attempts to check the condition of the road in the advancing direction well, and thus, the driver's line of sight tends to be concentrated on the narrow range. As the result, the saccade frequency $x_1$ may be reduced and become the similar value to the saccade frequency in the inattentive state. Accordingly, the correction coefficient is set such that, as the illuminance is reduced, the correction coefficient of the saccade frequency $x_1$ becomes larger than 1, that is, set in the direction in which the driver is less likely to be estimated in the inattentive state. In other words, the correction coefficient increases as the illuminance decreases. In this way, the saccade frequency $x_1$ can be corrected in a manner to cancel the influence of the illuminance.

Figure 5D:
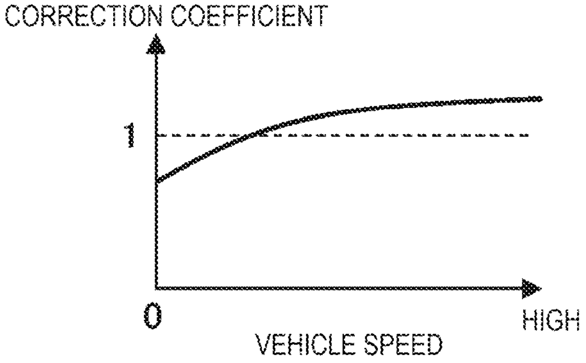

FIG. 5D is an exemplary map that defines a correction coefficient in the saccade frequency $x_1$ according to the vehicle speed. As the vehicle speed increases, the driver's field of view becomes narrower, and thus, the driver's line of sight tends to be concentrated on the narrow range. As the result, the saccade frequency $x_1$ may be reduced and become the similar value to the saccade frequency in the inattentive state. Accordingly, the correction coefficient is set such that, as the vehicle speed increases, the correction coefficient of the saccade frequency $x_1$ becomes larger than 1, that is, set in the direction in which the driver is less likely to be estimated in the inattentive state. In other words, the correction coefficient increases as the speed increases. In this way, the saccade frequency $x_1$ can be corrected in a manner to cancel the influence of the vehicle speed.

FIGS. 5A to 5D exemplifies the maps, each of which defines the correction coefficient of the saccade frequency $x_1$, and the correction coefficient maps are similarly set for the saccade amplitude $x_2$, the top-down attention score $x_3$, and the bottom-up attention score $x_4$ and are stored in the memory 10*b*.

Next, the controller 10 standardizes each of the feature values $x_i$ corrected in step S29 by using the mean $\mu_i$ and the variance $\sigma_i$ of the respective feature value $x_i$ stored in the memory 10*b* in the individual learning processing (step S30). In this way, each of the feature values $x_i$ reflecting the current driver state with the feature value $x_i$=0 of the driver in the normal state being a reference value may be evaluated.

Next, based on the travel environment information acquired in step S21, the controller 10 identifies whether the road on which the vehicle 1 is traveling corresponds to an ordinary road or the expressway, and acquires a weight coefficient $a_i$ that is set in advance for each of the feature values $x_i$ corresponding to the identified road (step S31). As described above, whether the estimated driver's behavior corresponds to the case where the inattentive state of the driver is simulated and the case where the normal state thereof is simulated is set as the response variables of the two values from the data on the movement of the line of sight acquired by the driving experiment using the driving simulator and the data on the travel environment simulated by the driving simulator, the value acquired by standardizing each of the feature values $x_i$ is set as the explanatory variable, and the logistic regression analysis was made to calculate the regression coefficient in advance. Such a regression coefficient is stored as the weight coefficient $a_i$ of each of the feature values $x_i$ in the memory 10*b*.

Here, the driver's search behavior differs between the ordinary road on which the vehicle speed is low but a large number of the attention objects such as the pedestrian and the intersection is present and the expressway in which the vehicle speed is high but a low attention objects such as no pedestrian, intersection, or the like exists. Accordingly, in the present embodiment, a driving experiment simulating the ordinary road and a driving experiment simulating the expressway are conducted by using the driving simulator, and the above-described logistic regression analysis is made on each of the experiment results. In this way, the weight factor $a_i$ is calculated for each of the case where the vehicle is traveling on the ordinary road and the case where the vehicle is traveling on the expressway, and is stored in the memory 10*b*.

Next, the controller 10 uses each of the feature values $x_i$ standardized in step S30 and the weight coefficient $a_i$ acquired in step S31 to calculate the inattentive probability p, which represents the probability that the driver is in the inattentive state, by using the following sigmoidal function, and stores the calculated inattentive probability p in the memory 10*b* (step S32).

$$p = \frac{1}{1 + e^{-\left(a_0 + \sum_{i=1}^{n} a_i x_i\right)}}$$

Next, the controller 10 acquires the inattentive probability p stored in the memory 10*b*, and determines whether a state where the inattentive probability p is equal to or higher than a threshold $p_{th}$ (for example, 80%) continues for a predetermined time (for example, 16 seconds) or longer until a present time point (step S33).

As a result, if the state where the inattentive probability p is equal to or higher than the threshold $p_{th}$ does not continue for the predetermined time or longer until the present time point (step S33: NO), the controller 10 estimates that the driver's state is normal (step S34), and terminates the driver state estimation processing.

On the other hand, if the state where the inattentive probability p is equal to or higher than the threshold $p_{th}$ continues for the predetermined time or longer until the present time point (step S33: YES), the controller 10 estimates that the driver is in the inattentive state.

Next, the controller 10 transmits the control signal to at least one of the display 36, the speaker 37, the transmission 3, the brake 4, and the steering device 5. The control signal is configured to notify the driver that the driver is in the inattentive state, e.g., causes at least one of the display 36 to output a visual alarm, the speaker 37 to output an audible alarm, and/or how to correct for the inattention, and/or one of the transmission 3, brake 4, and/or the steering device to be temporarily activated to correct for the inattention or a tactile alert the driver, e.g., shake the steering device (step S36). For example, the display 36 and the speaker 37 may output the image information and the audio information (line-of-sight guidance information) for guiding the driver's line of sight to the attention object that the driver has not visually recognized. After step S36, the controller 10 terminates the driver state estimation processing.

Figures 6A, 6B, 6C:
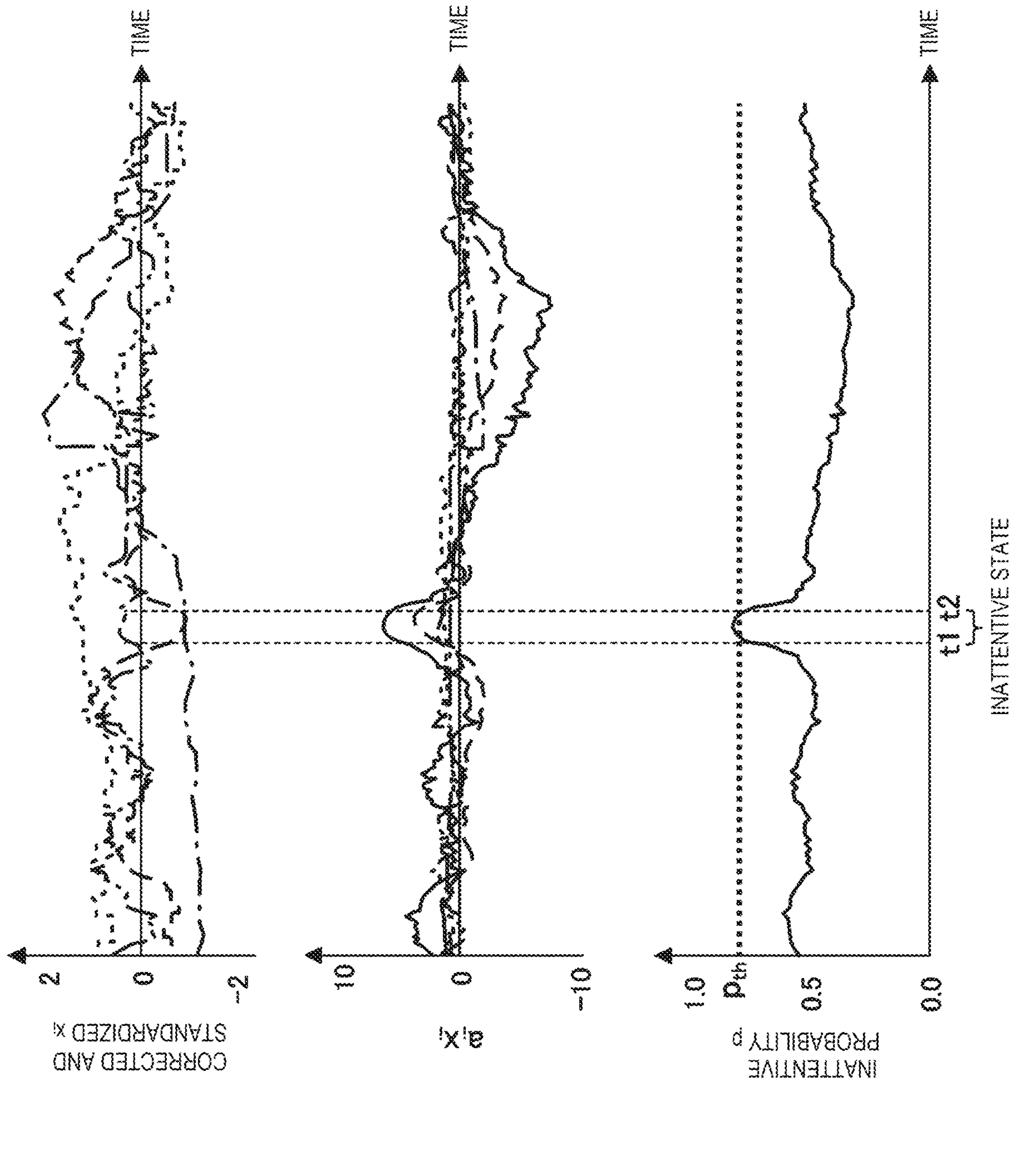
FIGS. 6A to 6C include time charts exemplifying temporal changes in feature values and inattentive probabilities of a driver's search behavioral indicators according to the embodiment.

FIGS. 6A to 6C include time charts exemplifying temporal changes in the feature value $x_i$ and the inattentive probability p of each of the search behavioral indicators when a driving experiment simulating the urban area is conducted by using the driving simulator. In FIGS. 6A, 6B, and 6C, a horizontal axis represents time. In addition, a vertical axis of FIG. 6A indicates the value of each of the corrected and standardized feature values $x_i$, a vertical axis of FIG. 6B indicates $a_i x_i$ that is acquired by multiplying each of the corrected and standardized feature values $x_i$ by the weight coefficient $a_i$, and a vertical axis of FIG. 6C indicates the inattentive probability p. In FIGS. 6A and 6B, a broken line indicates the saccade frequency $x_i$, a one-dot chain line indicates the saccade amplitude $x_2$, a two-dot chain line indicates the top-down attention score $x_3$, and a dotted line indicates the bottom-up attention score $x_4$. A solid line in FIG. 6B indicates a sum of $a_i x_i$, and a solid line in FIG. 6C indicates the inattentive probability p.

By correcting and standardizing the each of the feature values $x_i$ in the driver state estimation processing, as illustrated in FIG. 6A, the influence on the search behavior by the travel scene can be eliminated, and each of the feature values $x_i$ can be evaluated by using 0 as a common reference value. In the example of FIG. 6A, the saccade frequency $x_1$ (the broken line), the saccade amplitude $x_2$ (the one-dot chain line), and the bottom-up attention score $x_4$ (the dotted line) are relatively far from 0.

Furthermore, by multiplying each of the feature values $x_i$ by the weight coefficient $a_i$ that is acquired by the logistic regression analysis, the evaluation can take into account a magnitude of the influence of the respective feature value $x_i$ on the estimation of whether the driver is in the inattentive state. In the example of FIG. 6A, the saccade frequency $x_1$ (the broken line), the saccade amplitude $x_2$ (the one-dot chain line), and the bottom-up attention score $x_4$ (the dotted line) are relatively far from 0. Meanwhile, according to FIG. 6B, the saccade frequency $x_1$ (the broken line) has a value relatively larger than 0 in comparison with the saccade amplitude $x_2$ (the one-dot chain line) and the bottom-up attention score $x_4$ (the dotted line) (particularly between time t1 and time t2).

When the inattentive probability p is calculated by using the product $a_i x_i$ of each of the feature values $x_i$ and the respective weight coefficient $a_i$ illustrated in FIG. 6B, as illustrated in FIG. 6C, the inattentive probability p is equal to or higher than the threshold $p_{th}$ between the time t1 and the time t2. Thus, where a time from the time t1 to the time t2 is equal to or longer than a predetermined time (for example, 18 seconds), the driver is estimated to be in the inattentive state.

Modified Examples

In the above-described embodiment, the description has been made that the frequency $x_1$ and the amplitude $x_2$ of the saccade, the top-down attention score $x_3$, and the bottom-up attention score $x_4$ are used as the feature values of the plurality of the indicators of the driver's search behavior. However, some of these may be used in combination, or a feature value of further another indicator may be combined.

In addition, in the above-described embodiment, the description has been made that the controller 10 makes the correction by multiplying each of the feature values $x_i$ by the correction coefficient. However, the correction may be made by adding or subtracting the correction coefficient to or from each of the feature values $x_i$.

Operation/Effects

Next, operation and effects of the driver state estimation apparatus 100 in the present embodiment described above will be described.

For each of the plurality of indicators of the search behavior changed according to the driver's state, the controller 10 acquires the feature values $x_i$ including: the frequency and the amplitude of the saccade of the driver; and the top-down attention score indicating the degree of deviation from the appropriate line-of-sight distribution to the attention object around the vehicle 1, and uses the acquired feature values $x_i$, the preset weight coefficient $a_i$ for each of the feature values $x_i$, and the preset constant $a_0$ to calculate the inattentive probability p by the sigmoidal function. Accordingly, instead of only focusing on any single one of the indicators of the driver's search behavior as in conventional approaches, unique changes in the frequency and the amplitude of the saccade are comprehensively grasped to quantitatively evaluate the probability that the driver is in the inattentive state thereby improving the estimation thereof. Further, by using the top-down attention score to estimate that the driver is in a first state in which abnormal driving is due to a temporary abnormal state, i.e., an inattentive state, as opposed to changes in the feature values caused by as second state, in which abnormal driving is due to a fixed or permanent condition, e.g., disease, aging, or the like of the driver, estimation may be further improved.

In addition, since the controller 10 corrects each of the acquired feature values $x_i$ on the basis of the travel environment information, the feature values $x_i$ may be corrected to cancel the influence of the travel environment of the vehicle 1 and thereby more accurately calculate the inattentive probability p. Thus, erroneous estimation of the driver state caused by the travel environment may be prevented.

Furthermore, since the controller 10 corrects the feature value $x_i$ in the direction in which the driver is less likely to be estimated in the inattentive state as the gradient of the road on which the vehicle 1 is traveling is increased. Accordingly, when the driver is likely to be estimated in the inattentive state due to the large gradient of the road and the tendency that the driver's line of sight is concentrated on the narrow range, the feature value $x_i$ may be corrected to cancel the influence of the gradient of the road and thus to further accurately calculate the inattentive probability p.

Moreover, the controller 10 corrects the feature value $x_i$ in the direction in which the driver is less likely to be estimated in the inattentive state as the curvature of the road on which the vehicle 1 is traveling is increased. Accordingly, when the driver is likely to be estimated in the inattentive state due to the large curvature of the road and the tendency that the driver's line of sight is concentrated on the narrow range, the feature value $x_i$ may be corrected to cancel the influence of the curvature of the road and thus to further accurately calculate the inattentive probability p.

In addition, the controller 10 corrects the feature value $x_i$ in the direction in which the driver is less likely to be estimated in the inattentive state as the illuminance outside the vehicle 1 is reduced. Accordingly, when the driver is likely to be estimated in the inattentive state due to the low illuminance outside the vehicle and the tendency that the driver's line of sight is concentrated on the narrow range, the feature value $x_i$ may be corrected to cancel the influence of the illuminance and thus to further accurately calculate the inattentive probability p.

Furthermore, the controller 10 corrects the feature value $x_i$ in the direction in which the driver is less likely to be estimated in the inattentive state as the speed of the vehicle 1 is increased. Accordingly, when the driver is likely to be estimated in the inattentive state due to the high vehicle speed and the tendency that the driver's line of sight is concentrated on the narrow range, the feature value $x_i$ may be corrected to cancel the influence of the vehicle speed and thus to further accurately calculate the inattentive probability p.

REFERENCE SIGNS LIST

1: vehicle
10: controller
100: driver state estimation apparatus
21: outside camera
22: radar
23: navigation system
24: positioning system
25: vehicle speed sensor
26: acceleration sensor
27: yaw rate sensor
28: steering angle sensor
29: steering torque sensor
30: accelerator sensor
31: brake sensor
32: in-vehicle camera
36: display
37: speaker

The invention claimed is:

1. A driver state estimation apparatus that estimates a state of a driver who drives a vehicle, the driver state estimation apparatus comprising:

circuitry configured to:

receive travel environment information and a driver's line of sight; and estimate whether the driver is in a first state based on the travel environment information and the driver's line of sight, including acquiring a feature value $x_i$ (i=1, . . . , n) of each of a plurality of indicators of search behavior changed according to the driver's state based on the travel environment information and the driver's line of sight, calculating a first probability p, which represents a probability that the driver is in the first state, using the acquired feature value $x_i$ and a preset weight coefficient $a_i$ for each of the feature values $x_i$ and estimating that the driver is in the first state when the calculated first probability p is equal to or higher than a predetermined value continues for a predetermined time or longer, and in response to the driver being estimated to be in the first state, output a control signal to at least one of a display of the vehicle, a speaker of the vehicle, a driving force source of the vehicle, a transmission of the vehicle, a brake of the vehicle, and a steering device of the vehicle, to control operation of the vehicle, wherein the feature values $x_i$ include: a frequency and an amplitude of a saccade of the driver that are acquired on the basis of the driver's line of sight, and a top-down attention score that indicates a degree of deviation from appropriate line-of-sight distribution to the attention object around the vehicle, based on the travel environment information and the driver's line-of-sight.

2. The driver state estimation apparatus according to claim 1, wherein the circuitry is configured to correct each of the acquired feature values $x_i$ based on the travel environment information.

3. The driver state estimation apparatus according to claim 2, wherein the circuitry is configured to acquire a gradient of a road on which the vehicle is traveling based on the travel environment information and correct the feature value $x_i$ using a correction coefficient that increases as the gradient increases.

4. The driver state estimation apparatus according to claim 2, wherein the circuitry is configured to acquire curvature of a road on which the vehicle is traveling based on the travel environment information and correct the feature value $x_i$ using a correction coefficient that increases as the curvature increases.

5. The driver state estimation apparatus according to claim 2, wherein the circuitry is configured to acquire illuminance outside the vehicle based on the travel environment information and correct the feature value $x_i$ using a correction coefficient that increases as the illuminance decreases.

6. The driver state estimation apparatus according to claim 2, wherein the circuitry is configured to acquire a speed of the vehicle based on the travel environment information and correct the feature value $x_i$ using a correction coefficient that increases as the speed increases.

7. The driver state estimation apparatus according to claim 1, wherein, to calculate the first probability, the circuitry is configured to use a bounded, monotonic, differentiable, real function.

8. The driver state estimation apparatus according to claim 7, wherein the bounded, monotonic, differentiable, real function uses a preset constant $a_0$, and is given by the following equation:

$$p = \frac{1}{1 + e^{-\left(a_0 + \sum_{i=1}^{n} a_i x_i\right)}}.$$

9. The driver state estimation apparatus according to claim 1, wherein the circuitry is configured to guide the driver's line of sight to an object that the driver has not visually recognized.

10. The driver state estimation apparatus according to claim 1, wherein the circuitry is configured to output a visual, audible, and/or tactile alarm notifying the driver.

11. The driver state estimation apparatus according to claim 1, wherein, in response to the driver being in the first state, the circuitry is configured to control an operation of the vehicle.

12. A method of estimating a state of a driver who drives a vehicle, the method comprising:

receiving travel environment information of the vehicle from a travel environment information acquisition device and a driver's line of sight from a line-of-sight detection device;

determining a feature value $x_i$ (i=1, . . . , n) of each of a plurality of indicators of search behavior changed according to the driver's state based on the travel environment information and the driver's line of sight, calculating a first probability p, which represents a probability that the driver is in a first state, using the acquired feature value $x_i$ and a preset weight coefficient $a_i$ for each of the feature values $x_i$, and estimating that the driver is in the first state when the calculated first probability p is equal to or higher than a predetermined value continues for a predetermined time or longer, and in response to the driver being estimated to be in the first state, outputting a control signal to at least one of a display of the vehicle, a speaker of the vehicle, a driving force source of the vehicle, a transmission of the vehicle, a brake of the vehicle, and a steering device of the vehicle, to control operation of the vehicle, wherein the feature values $x_i$ include: a frequency and an amplitude of a saccade of the driver that are acquired on the basis of the driver's line of sight; and a top-down attention score that indicates a degree of deviation from appropriate line-of-sight distribution to the attention object around the vehicle, based on the travel environment information and the driver's line-of-sight.

13. The method according to claim 12, wherein calculating the first probability p is by the following equation using the standardized feature value $x_i$, the weight coefficient $a_i$, and a preset constant $a_0$, $$p = \frac{1}{1 + e^{-\left(a_0 + \sum_{i=1}^{n} a_i x_i\right)}}.$$

14. A non-transitory computer readable storage device having computer readable instructions that when executed by circuitry cause the circuitry to perform a method of estimating a state of a driver who drives a vehicle, the method comprising:

receiving travel environment information of the vehicle from a travel environment information acquisition device and a driver's line of sight from a line-of-sight detection device;

determining a feature value $x_i$ (i=1, . . . , n) of each of a plurality of indicators of search behavior changed according to the driver's state based on the travel environment information and the driver's line of sight, calculating a first probability p, which represents a probability that the driver is in a first state, using the acquired feature value $x_i$ and a preset weight coefficient $a_i$ for each of the feature values $x_i$, and estimating that the driver is in the first state when the calculated first probability p is equal to or higher than a predetermined value continues for a predetermined time or longer, and in response to the driver being estimated to be in the first state, outputting a control signal to at least one of a display of the vehicle, a speaker of the vehicle, a driving force source of the vehicle, a transmission of the vehicle, a brake of the vehicle, and a steering device of the vehicle, to control operation of the vehicle, wherein the feature values $x_i$ include: a frequency and an amplitude of a saccade of the driver that are acquired on the basis of the driver's line of sight; and a top-down attention score that indicates a degree of deviation from appropriate line-of-sight distribution to the attention object around the vehicle, based on the travel environment information and the driver's line-of-sight.

15. The method according to claim 12, further comprising guiding the driver's line of sight to an object that the driver has not visually recognized.

16. The method according to claim 12, further comprising outputting a visual, audible, and/or tactile alarm notifying the driver.

17. The method according to claim 12, further comprising correcting each of the feature values $x_i$ based on the travel environment information.

18. The method according to claim 12, wherein calculating the first probability p uses a bounded, monotonic, differentiable, real function.

19. The method according to claim 12, further comprising standardizing each of the feature values $x_i$ using a mean and a variance of the feature value $x_i$ acquired for the driver during a preceding individual learning process performed while the driver is in a normal state.

20. The method according to claim 12, wherein the feature values $x_i$ further include a bottom-up attention score that indicates a degree to which the driver's line of sight is directed to a position of high saliency in front of the vehicle.

* * * * *